United States Patent [19]

Sakamaki

[11] Patent Number: 4,951,955
[45] Date of Patent: Aug. 28, 1990

[54] CHUCK FOR TOOLS

[75] Inventor: Iwao Sakamaki, Ojiya, Japan

[73] Assignee: Sakamaki Mfg. Co., Ltd., Niigata, Japan

[21] Appl. No.: 362,433

[22] PCT Filed: Oct. 14, 1988

[86] PCT No.: PCT/JP88/01049
§ 371 Date: May 17, 1989
§ 102(e) Date: May 17, 1989

[87] PCT Pub. No.: WO89/03267
PCT Pub. Date: Apr. 20, 1989

[30] Foreign Application Priority Data

Oct. 16, 1987 [JP] Japan ................... 62-261970

[51] Int. Cl.$^5$ ............................. B23B 31/10
[52] U.S. Cl. ................. 279/62; 279/1 K; 279/60
[58] Field of Search ............ 279/1 K, 61, 62, 60

[56] References Cited

U.S. PATENT DOCUMENTS

| | | | |
|---|---|---|---|
| 2,684,856 | 7/1954 | Stoner | 279/61 |
| 4,277,074 | 7/1981 | Kilberis | 279/62 |
| 4,526,497 | 7/1985 | Hatfield | 279/1 K |
| 4,669,932 | 6/1987 | Hartley | 279/1 K |
| 4,682,918 | 7/1987 | Palm | 279/1 K |
| 4,695,065 | 9/1987 | Komatsu et al. | 279/1 K |
| 4,840,387 | 6/1989 | McCarthy | 279/1 K |

Primary Examiner—Daniel W. Howell
Attorney, Agent, or Firm—Fulbright & Jaworski

[57] ABSTRACT

A chuck for a tool according to the present invention incorporates a clutch mechanism (17) between a rotating member (3) and a rotating nut (4). The clutch mechanism intermittently cuts off the transmission of power from the rotating nut to the rotating member, generating an impact force. This impact force increases the amount of force with which a tool (W) such as a drill is fastened and makes release of the tool smooth.

1 Claim, 9 Drawing Sheets

CHUCK FOR TOOLS

BACKGROUND OF THE INVENTION

1. Field of the Invention:

The present invention relates to a chuck for a tool such as a drill.

Figure 10:
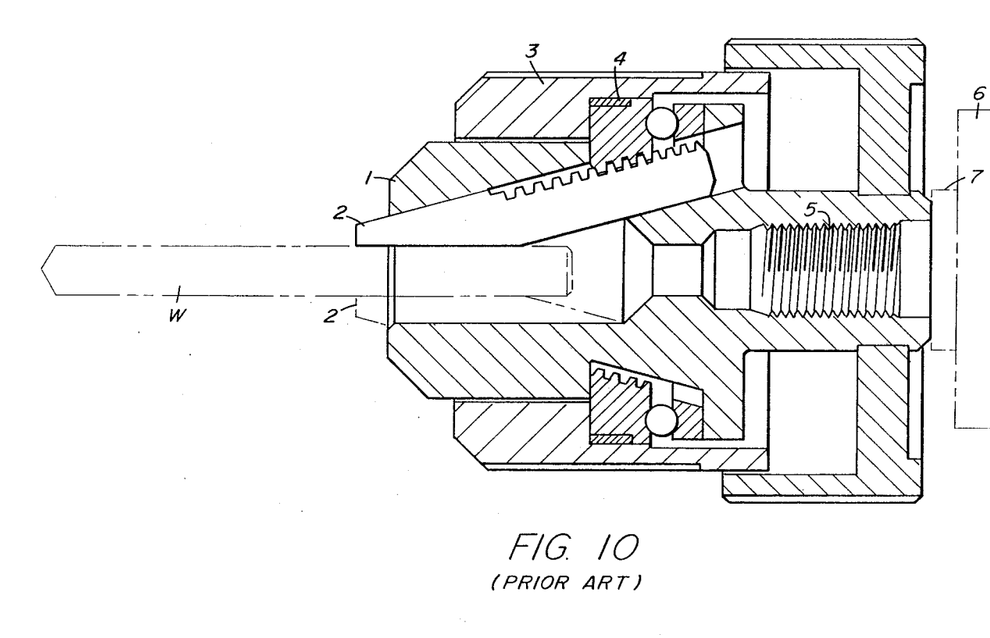
FIG. 10 is a cross-sectional view of a conventional chuck.
Figure 11:
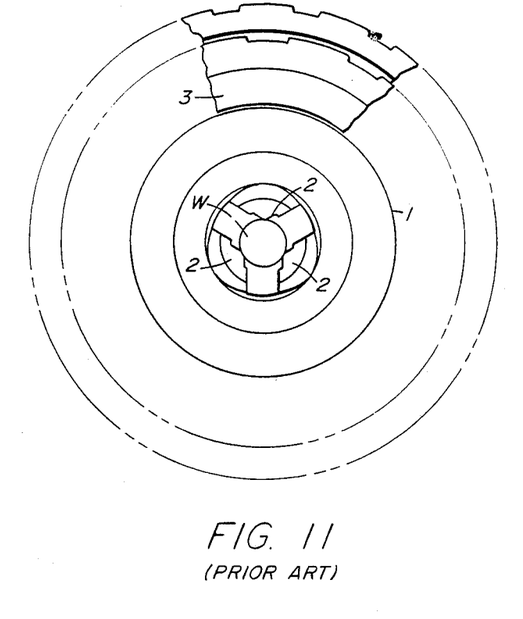
FIG. 11 is a front view of the chuck of FIG. 10, with parts broken away for clarity.

2. Description of the Related Art:

FIGS. 10 and 11 show a conventional chuck for a tool of the above-described type. This chuck includes a chuck body 1, three jaws 2 mounted on the chuck body 1, a rotating member 3 and a rotating nut 4 threadingly engaged with the jaws 2. The jaws 2 are caused to slide in a slanted attitude and thereby contract and expand due to the threaded engagement of the jaws 2 with the rotating nut 4 by rotating the rotating member 3.

In this conventional chuck, the jaws 2 contract and a tool W is thereby fastened when an operator grips and rotates the rotating member 3. Further, the jaws 2 are also caused to contract so as to fasten the tool W by rotating the chuck body 1. Rotation of the chuck body 1 is achieved by fixing a spindle 7 such as an electric drill to a mounting portion 5 of the chuck body 1 and by rotating the spindle 7 while the rotating member 3 is being held stationary by an operator.

However, in the conventional chuck, the fastening force of the tool W is obtained by the interaction of the gripped force of the rotating member 3 and the rotating force of the chuck body 1, and this causes the tool to be fastened with an insufficient amount of force.

SUMMARY OF THE INVENTION

An object of the present invention is to provide a chuck for a tool which is capable of obviating the abovedescribed problem of the prior art.

To this end, the present invention provides a chuck for a tool in which a plurality of jaws mounted on a chuck body are caused to slide in a slanted attitute and thereby contract and expand by virtue of the threaded engagement of the jaws with a rotating nut by rotating a rotating member. The chuck for the tool is characterized by the inclusion of a clutch mechanism which is provided between the rotating member and the rotating nut.

With the above-described arrangement, when the chuck body is rotated with the rotating member being held stationary so that the rotating nut does not rotate, the jaws are caused to slide in a slanted attitude and contract by virtue of the threaded engagement of the jaws with the rotating nut and the tool is thereby fastened by the jaws. When the chuck body is further rotated in this state, the transmission of power from the rotating nut to the rotating member is intermittently cut off by the clutch mechanism.

In the present invention, the transmission of power is intermittently cut off by the clutch mechanism, generating an impact force. This impact force increases the amount of force with which the tool is fastened, and makes release of the tool smooth.

DETAILED DESCRIPTION OF THE PREFERRED EMBODIMENTS

The present invention will now be described by way of example with reference to FIGS. 1 to 9.

In the embodiments described later, it is to be noted that the same reference numerals are used to denote parts which are the same as those in the conventional example shown in FIG. 10.

First, a first embodiment will be described with reference to FIGS. 1 to 5. A chuck has a chuck body 1, and three jaws 2 are mounted on this chuck body 1 in a radial form in such a manner that it can be caused to slide in a slanted attitude and thereby contract and expand. Further, a rotating member 3 and a rotating nut 4 are rotatably mounted on the chuck body 1. The rotating nut 4 has grooves 4a, by which it is divided into two parts. These parts are assembled to form the rotating nut after being manufactured. A form retaining ring 8 is fitted on the outer peripheral surface of the rotating nut 4 and has the function of maintaining the form of the rotating nut 4. The inner surface of the rotating nut 4 is internally threaded, and this internal thread 9 is engaged with an external thread 10 formed on the outer peripheral surface of the jaws 2. The outer peripheral surface of the rotating member 3 is provided with a plurality of recessed portions 11. A washer plate 13 is located on the side of a flange portion 12 of the chuck body 1 which is closer to the rotating nut 4, and spherical bearing bodies 14 are provided between the washer plate 13 and the rotating nut 4.

Figure 1:
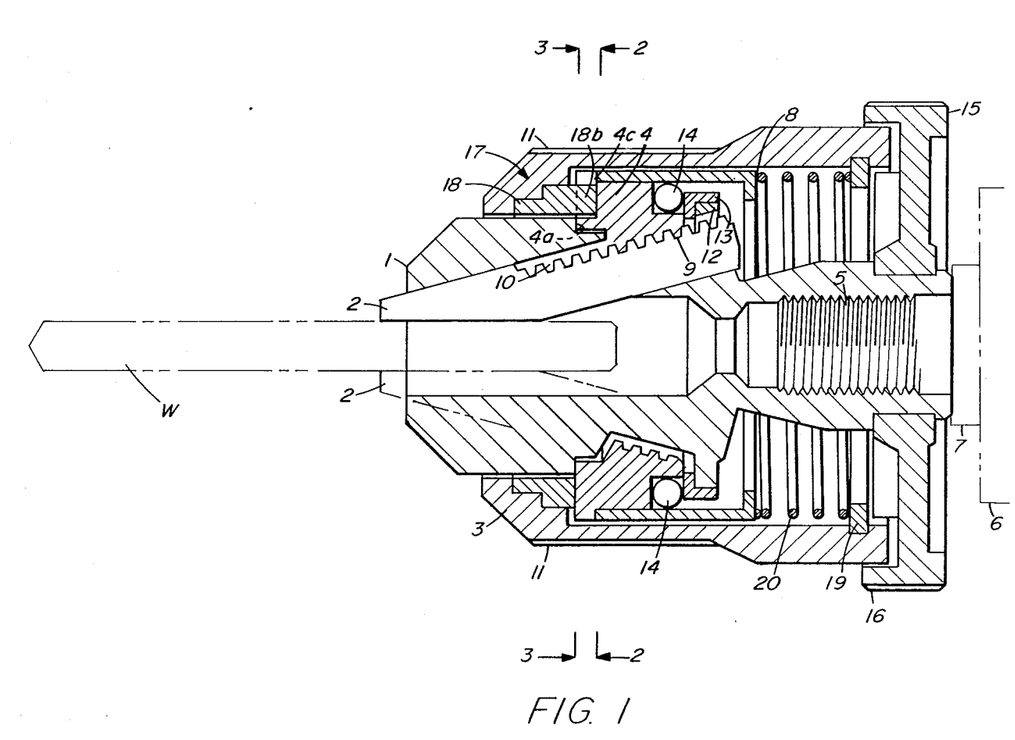
FIG. 1 is a cross-sectional view of a chuck, showing a first embodiment of the present invention.
Figure 2:
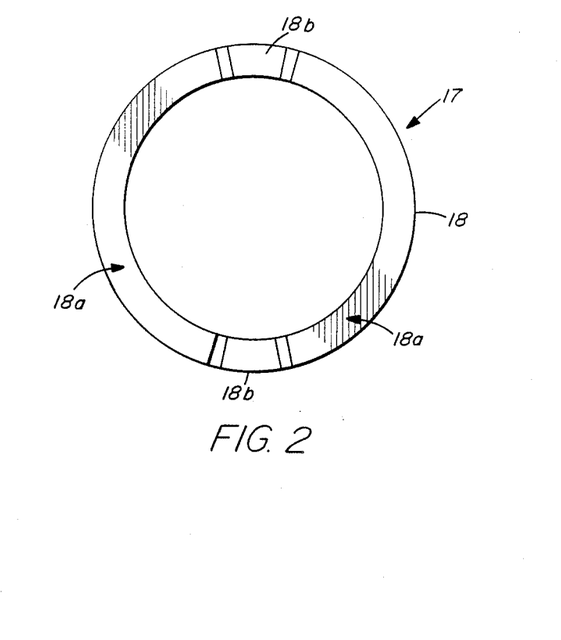
FIG. 2 is a section taken along the line A—A of FIG. 1, showing an annular body of a clutch mechanism.
Figure 3:
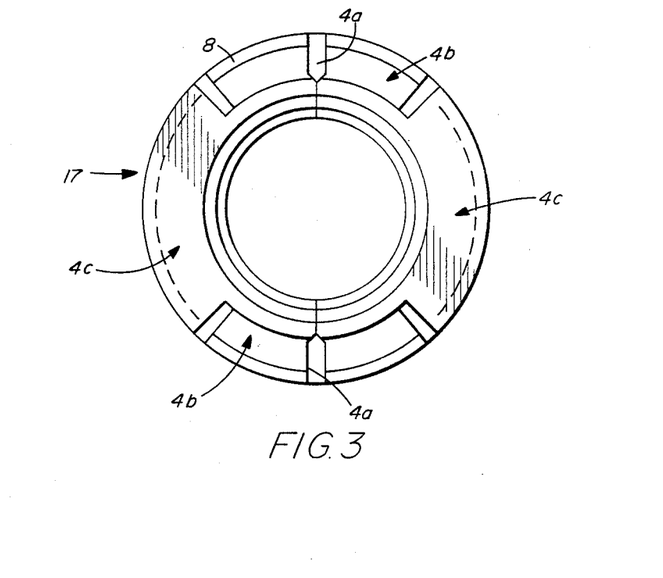
FIG. 3 is a section taken along the line B—B of FIG. 1, showing a rotating nut of the clutch mechanism.
Figure 4:
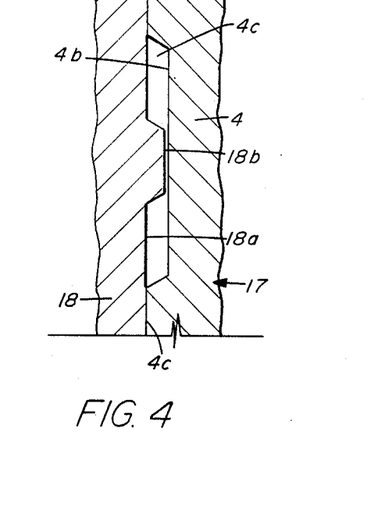
FIG. 4 is an enlarged cross-sectional view of the essential parts of the clutch mechanism.

A gripping ring 15 is fixed to the chuck body 1 in such a manner that it does not rotate. The outer peripheral surface of the gripping ring 15 is provided with recessed portions 16.

A clutch mechanism 17 includes two recessed portions 4b and two convex portions 4c formed equiangularly on the rotating nut 4, two recessed portions 18a and two convex portions 18b formed on a ring body 18 around portions of its circumference respectively representing 150° and 30° of the 180° whole, which ring body is integrally formed with the rotating member 3, a locking ring 19 provided on the inner peripheral surface of the rear portion of the rotating member 3, and a clutch spring 20 provided between the form retaining ring 8 and the locking ring 19 for urging the rotating member 3 in the rightward direction as viewed in FIG. 1.

With the above-described arrangement, when the rotating member 3 is rotated while the gripping ring 15 is held stationary, the rotating nut 4 is rotated by the engagement of the convex portions 4c with the convex portions 18b of the clutch mechanism 17, causing the jaws 2 to slide in a slanted attitude and to contract due to the threaded engagement of the rotating nut 4 with the jaws 2, a tool W thereby being fastened by the jaws 2.

When the rotating member 3 is rotated in the opposite direction, the jaws 2 are caused to slide in a slanted attitude and thereby expand so that the tool W can be removed by virtue of the threaded engagement of the rotating nut 4 with the jaws 2.

Further, when a spindle 7 such as an electric drill 6 is rotated with the rotating member 3 held stationary so that the rotating nut 4 does not rotate, the chuck body 1 rotates, causing the jaws 2 to slide in a slanted attitude and contract due to the threaded engagement of the internal thread 9 formed on the rotating nut 4 with the external thread 10 on the jaws 2. When the spindle 7 is rotated in the opposite direction, the jaws 2 are caused to slide in a slanted attitude and expand.

Figure 5:
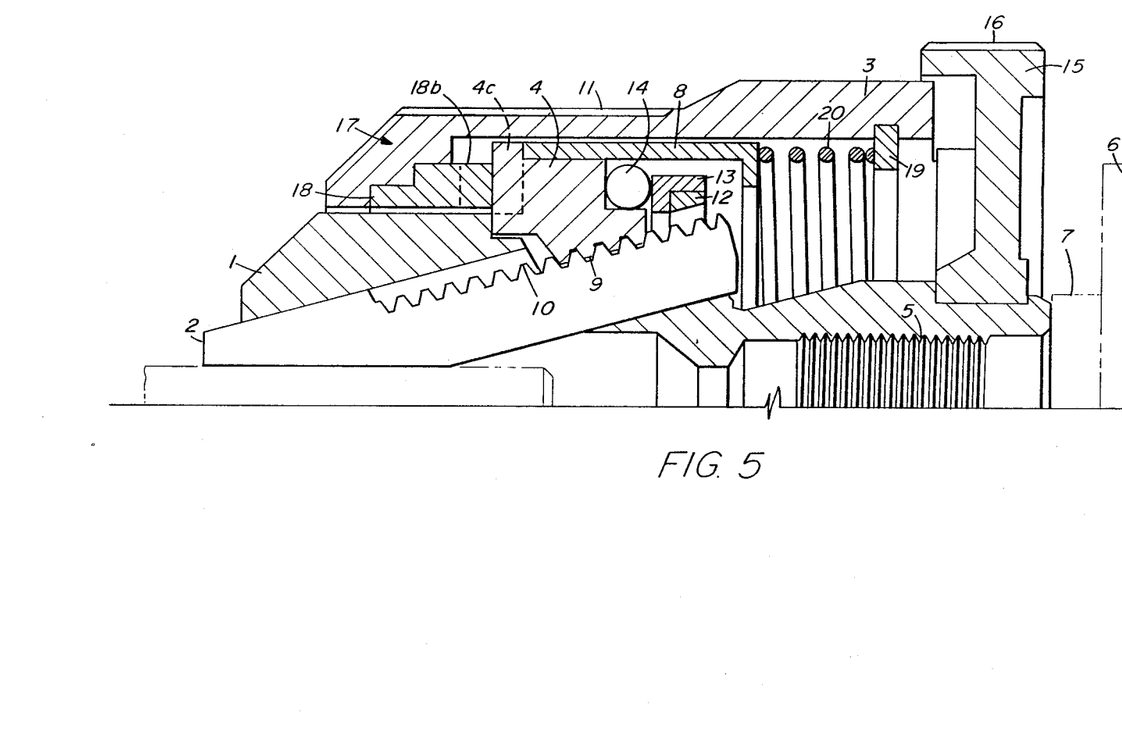
FIG. 5 is an enlarged cross-sectional view of an upper half of the chuck, showing the operation thereof.

In a case where the jaws 2 are caused to slide in a slanted attitude and contract so as to fasten the tool W by virtue of the rotation of the spindle 7 such as the electric drill 6 while the rotating member 3 is being held stationary, when the spindle 7 is further rotated after the jaws 2 abutted against the tool W, the rotating member 3 moves in the leftward direction as viewed in FIG. 5 against the urging force of the clutch spring 20 and then the convex portions 4c rise on the convex portions 18b, cutting off the transmission of power to the rotating member 3. This results in slippage of the rotating member 3 and rotation of the rotating nut. Subsequently, the convex portions 4c and 18b enter the recessed portions 4b and 18b under the action of the clutch spring 20, and the rotating member 3 moves back in the rightward direction. Thereafter, the convex portions 4c abut against and rise on the convex portions 18b again. The impact force generated by the intermittent contact of the convex portions 4c with the convex portions 18b is exerted on the rotating nut 4 as a reaction force, increasing the amount of fastening force applied to the tool and making release of the tool W smooth.

Furthermore, since the rotating nut 4 is supported by the bearing bodies 14, rolling contact makes the rotation of the rotating nut 4 smooth. That is, the tightening, release and rotation of the rotating nut 4 can be made smooth, thereby making the fastening and release of the tool W smooth.

Further, since the rotating member 3 slips when the transmission of power to the rotating member is cut off, any possibility of an operator's hand being injured can be eliminated, thus improving the level of safety.

Next, a second embodiment of the present invention will be described with reference to FIGS. 6 and 7. A chuck has a chuck body 1, and three jaws 2 are mounted on this chuck body 1 in a radial form in such a manner that it can be caused to slide in a slanted attitude and thereby contract and expand. Further, a rotating member 3 and a rotating nut 4 are rotatably mounted on the chuck body 1. The rotating nut 4 has grooves 4a, by which it is divided into two parts. These parts are assembled to form the rotating nut after being manufactured. A form retaining ring 8 is fitted on the outer peripheral surface of the rotating nut 4 and has the function of maintaining the form of the rotating nut 4. The inner peripheral surface of the form retaining ring 8 and the outer peripheral surface of the chuck body 1 are respectively provided with annular grooves 1a and 8a. A plurality of spherical bearing bodies 14 are inserted between the annular grooves 1a and 8a from a ball inserting hole 21 formed in the form retaining ring 8 so that the form retaining ring 8 and the rotating nut 4 are supported by the bearing bodies 14 with respect to the chuck body 1 in the axial and rotational directions. The ball inserting hole 21 is closed by a plug body 22.

Figure 6:
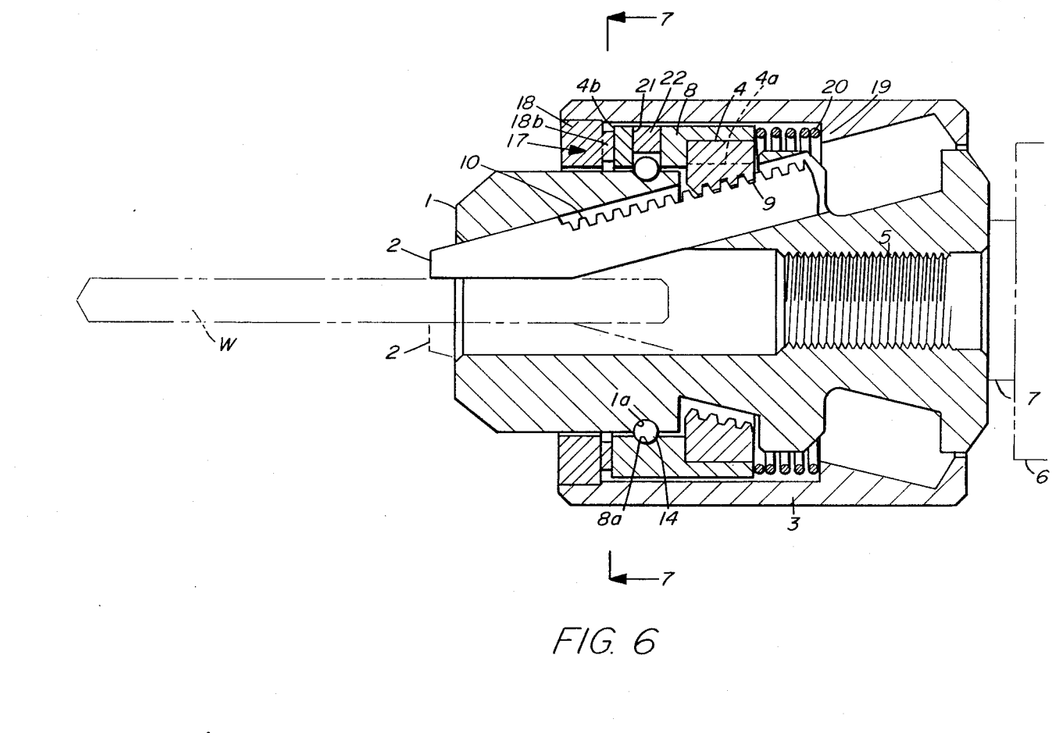
FIG. 6 is a cross-sectional view of a chuck, showing a second embodiment of the present invention.

A clutch mechanism 17 includes four convex portions 18b formed on an annular body 18 fitted in the rotating member 3, recessed portions 18a that form the portion other than the convex portions 18b, four convex portions 4c formed on the rotating nut 4, recessed portions 4b that form the portion other than the convex portions 4c, a locking portion 19 formed on the inner peripheral portion of the rear portion of the rotating member 3, and a clutch spring 20 provided between the form retaining ring 8 and the locking portion 19 for urging the rotating member 3 in the rightward direction as viewed in FIG. 6.

With the above-described arrangement, the impact force generated by the intermittent contact with the convex portions 4c with the convex portions 18b is exerted on the rotating nut 4 as a reaction force, as in the case of the first embodiment, increasing the amount of force with which the tool is fastened and making release of the tool W smooth.

Figure 7:
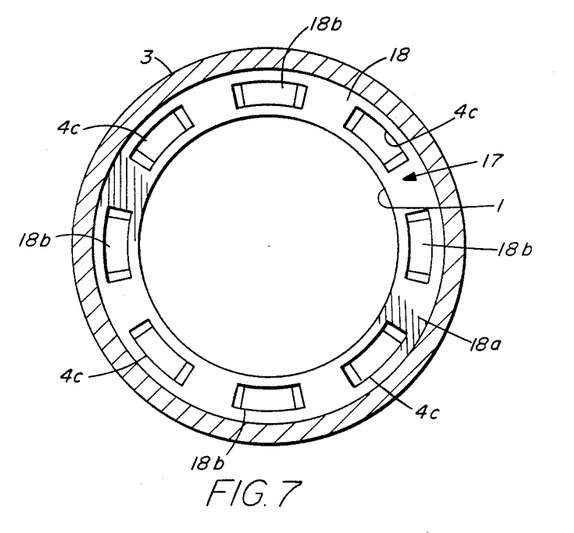
FIG. 7 is a section taken along the line A—A of FIG. 6.
Figure 8:
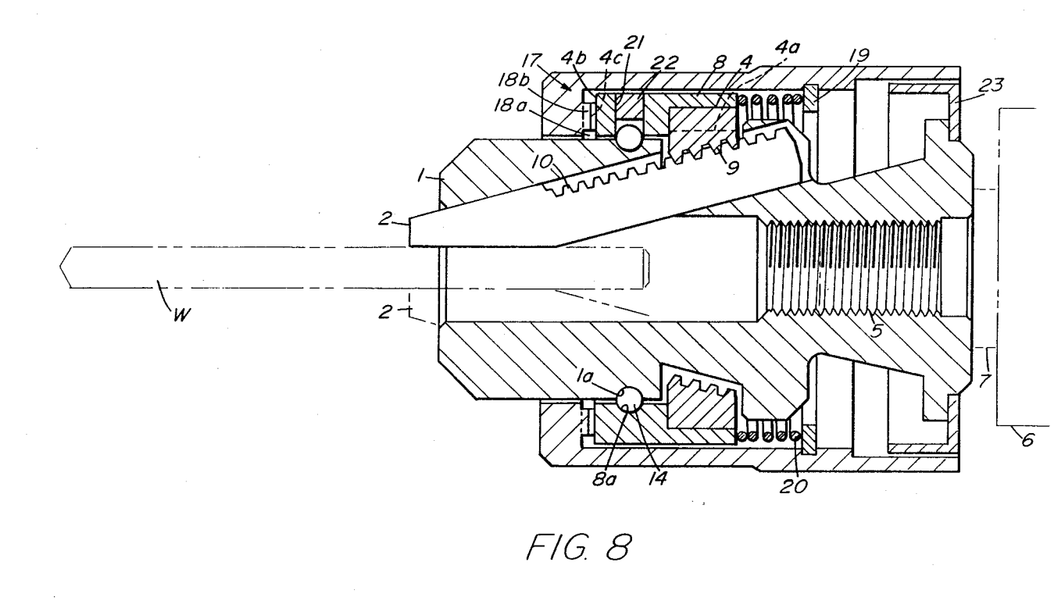
FIG. 8 is a cross-sectional view of a chuck, showing a third embodiment of the present invention.

A third embodiment of the present invention shown in FIG. 8 differs from the second embodiment shown in FIGS. 6 and 7 in that the annular body 18 is formed integrally with the rotating member 3, in that a cover 23 is fitted in the chuck body 1, and in that a locking ring 19 is mounted on the rotating member 3. Other structure is the same as that of the second embodiment.

Even though the second and third embodiments are assembled in the different ways, they are operated in the same way.

Figure 9:
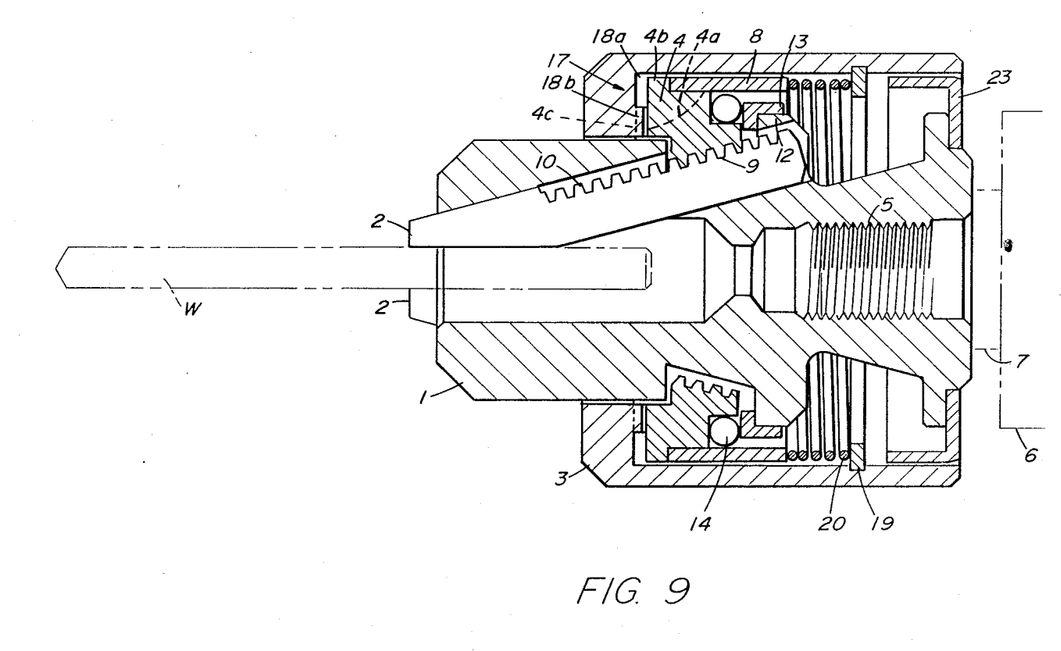
FIG. 9 is a cross-sectional view of a chuck, showing a fourth embodiment of the present invention.

A fourth embodiment shown in FIG. 9 is similar to the embodiment shown in FIGS. 1 to 5.

That is, a cover 23 is fitted in the chuck body 1. Further, an annular body 18 is eliminated and convex portions 18b and recessed portions 18a are directly formed in the rotating member 3, which, together with convex portions 4c and recessed portions 4b in the rotating nut 4, form a clutch mechanism 17. Other structure is the same as that of the embodiment shown in FIGS. 1 to 5.

This fourth embodiment is operated in the same manner in which any of the first, second and third embodiments is operated.

The numbers of convex portions 4c and 18b of the clutch mechanism 17 are not limited to those described above. Further, a clutch mechanism 17 having other structure may also be employed.

As will be understood from the foregoing description, a chuck for a tool according to the present invention is most suitably used to tightly fasten a tool such as a drill and release the fastening of the tool.

What is claimed is:
1. A chuck for a tool comprising:
   A chuck body having an axial central hole and a plurality of inclined holes extending radially therefrom;
   a plurality of jaws having male screw threads on an outer peripheral surface, said jaws set inside said inclined holes and capable of sliding;
   A rotating nut rotatably mounted on the chuck body, said rotating nut having female screw threads on the internal surface for engaging the male screw threads;

A cylindrical rotating member rotatably and movably mounted to the axial direction of the chuck body, said rotating member positioned to cover the rotating nut, wherein the rotational force produced at the rotating member is transmitted to the rotating nut resulting in the male screw threads engaging the female screw threads and causing the jaws to contract or expand, by sliding along said inclined holes;

A clutch mechanism including a locking ring, a form retaining ring, a clutch spring, a ring body integrally formed with the rotating member, first recessed portions aNd first convex portions formed equiangularly on the rotating nut, and second recessed portions and second convex portions formed on the ring body, said first and second recessed portions and first and second convex portions are opposite reciprocally, and cross at right angles, the locking ring is on the inner peripheral surface of the rear portion of the rotating member and the clutch spring is positioned between the form retaining ring and the locking ring and exerts directional tension on the rotating member and wherein the convexes transmit the force by engaging with the concaves and intercept the force by the lapping of the convexes:

Spherical bearing bodies for smooth operation positioned between the surface of the rotating nut and the surface of the chuck body, said surfaces rotating relatively and confronting reciprocally.

* * * * *